US008618694B2

(12) United States Patent  (10) Patent No.: US 8,618,694 B2
Santos et al.  (45) Date of Patent: Dec. 31, 2013

(54) SYSTEM, METHOD, AND COMPUTER PROGRAM PRODUCT FOR UTILIZING A WIND PARK AS A VARIABLE POWER SYSTEM STABILIZER

(75) Inventors: Juan Santiago Santos, Katy, TX (US); Brett D. Rollow, Katy, TX (US); Jason Hoffman, Houston, TX (US)

(73) Assignee: Vestas Wind Systems A/S, Aarhus N. (DK)

( * ) Notice: Subject to any disclaimer, the term of this patent is extended or adjusted under 35 U.S.C. 154(b) by 211 days.

(21) Appl. No.: 12/827,756

(22) Filed: Jun. 30, 2010

(65) Prior Publication Data

US 2012/0004781 A1  Jan. 5, 2012

(51) Int. Cl.
*H02J 3/24* (2006.01)
*H02M 1/12* (2006.01)

(52) U.S. Cl.
USPC .......................................... 307/102; 307/105

(58) Field of Classification Search
USPC .................................................. 307/102, 105
See application file for complete search history.

(56) References Cited

U.S. PATENT DOCUMENTS

| 6,452,819 | B1 * | 9/2002 | Wobben | 363/40 |
|---|---|---|---|---|
| 6,559,561 | B1 | 5/2003 | Angquist | |
| 7,119,452 | B2 * | 10/2006 | Larsen | 290/55 |
| 7,166,928 | B2 * | 1/2007 | Larsen | 290/55 |
| 7,224,081 | B2 * | 5/2007 | Larsen | 290/44 |
| 7,663,348 | B2 | 2/2010 | Oohara et al. | |
| 7,728,452 | B2 * | 6/2010 | Arinaga et al. | 290/44 |
| 7,800,243 | B2 * | 9/2010 | Bendixen et al. | 290/44 |
| 7,902,686 | B2 * | 3/2011 | Andersen et al. | 290/44 |
| 2009/0001940 | A1 | 1/2009 | Sihler et al. | |
| 2009/0099798 | A1 | 4/2009 | Gong et al. | |
| 2009/0222144 | A1 | 9/2009 | Venkatasubramanian et al. | |
| 2010/0049455 | A1 | 2/2010 | Scholtz et al. | |

FOREIGN PATENT DOCUMENTS

| EP | 2175540 A2 | 4/2010 |
|---|---|---|
| EP | 2182207 A2 | 5/2010 |

OTHER PUBLICATIONS

European Patent Office, Notification of Transmittal of the International Search Report and the Written Opinion of the International Searching Authority issued in related International Application No. PCT/DK2011/050250 dated Feb. 3, 2012.

* cited by examiner

*Primary Examiner* — Adi Amrany
(74) *Attorney, Agent, or Firm* — Patterson & Sheridan, LLP

(57) ABSTRACT

System, method, and computer program product for dampening oscillations of the electrical power on a power grid. The system includes a wind park with multiple wind turbines. Each wind turbine includes a rotor, a generator operatively coupled with the rotor for generating electrical power, and an inverter coupling the generator with the power grid to output the electrical power to the power grid. A controller is configured to generate a first control signal to cause the inverter of the first wind turbine to modulate the electrical power output by the first wind turbine for dampening oscillations of one frequency in electrical power on the power grid and to generate a second control signal to cause the inverter of the second wind turbine to modulate the electrical power output by the second wind turbine for dampening oscillations of a different frequency in the electrical power on the power grid.

17 Claims, 3 Drawing Sheets

SYSTEM, METHOD, AND COMPUTER PROGRAM PRODUCT FOR UTILIZING A WIND PARK AS A VARIABLE POWER SYSTEM STABILIZER

BACKGROUND

This application relates generally to electrical power generation and power system stabilization and, more specifically, to systems, methods, and computer program products for utilizing wind turbines in a wind park as variable power system stabilizers.

Wind turbines can be used to produce electrical energy without the necessity of fossil fuels. Generally, a wind turbine is a rotating machine that converts the kinetic energy of the wind into mechanical energy and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle.

A wind park is a collection of wind turbines that are connected to the power grid and collectively supply electrical power to the power grid. The power grid has defined parameters, in particular a defined voltage and a defined frequency. The stability of the power grid parameters is dependent on several variables including but not limited to the instantaneous balance between the generated power at the wind park and the consumed power in the power grid. Imbalances lead to changes in the voltage and/or frequency of the power grid. Stability of the grid frequency is important, which provides ample motivation to minimize low frequency fluctuations.

One common type of transient disturbance within a power system is constituted by small signal stability concerns, which are well known phenomena within the power engineering industry. Small signal stability is defined as the ability of the power system to remain stable and synchronous in the presence of small disturbances and is usually associated with power system's ability or inability to dampen such low frequency electro-mechanical oscillations. Because of the increasing capacity of generation units, increased loading of transmission lines, and high-speed excitation systems, fewer than all of the dynamic characteristics of a transmission system may be captured. This hinders the ability to effectively respond to the low frequency oscillations associated with small signal stability concerns.

Improved systems, methods and computer program products are needed to permit a wind park to effectively respond to small signal stability concerns on the power grid.

BRIEF SUMMARY

In an embodiment of the invention, a system is provided for dampening first oscillations of a first frequency and second oscillations of a second frequency in electrical power on a power grid. The system includes a wind park with first and second wind turbines. Each of the first and second wind turbines includes a rotor, a generator operatively coupled with the rotor for generating electrical power, and an inverter coupling the generator with the power grid to output the electrical power to the power grid. The system further includes a controller configured to generate a first control signal to operate the inverter of the first wind turbine for modulating the electrical power output by the first wind turbine to dampen the first oscillations and to generate a second control signal to operate the inverter of the second wind turbine for modulating the electrical power output by the second wind turbine to dampen the second oscillations.

In another embodiment of the invention, a method is provided for dampening first oscillations of a first frequency and second oscillations of a second frequency in electrical power on a power grid. The method includes operating an inverter of a first wind turbine to modulate electrical power output from the generator of the first wind turbine for dampening the first oscillations. The method further includes operating an inverter of a second wind turbine to modulate electrical power output from the generator of the second wind turbine for dampening the second oscillations.

In yet another embodiment of the invention, a computer program product includes first program instructions for operating an inverter of a first wind turbine in a wind park to modulate electrical power output from a generator of the first wind turbine for dampening first oscillations of a first frequency in electrical power on a power grid. The computer program product further includes second program instructions for operating an inverter of a second wind turbine in the wind park to modulate electrical power output from a generator of the second wind turbine for dampening second oscillations of a second frequency in the electrical power on the power grid. The first and second program instructions are stored on a computer readable storage medium.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

The embodiments of the invention relate to the control and operation of a large group of wind turbines arranged as a wind park. Wind turbines are equipped with measurement and control devices to enable the wind turbines to independently react to the characteristics of the power on the transmission system of the power grid. Embodiments of the invention utilize an existing control system, such as the Power Plant Control (PPC), to send a signal to the wind turbines in the wind park to modulate power output and aid in the damping of low frequency oscillations characteristic of small signal stability concerns. Consequently, the control system causes a wind park to modify the grid stability. The signal from the control system activates the firing of the wind turbine inverters to provide a variable inverse response to each small signal stability concern and to damp the accompanying power swing on the power grid.

Figure 1:
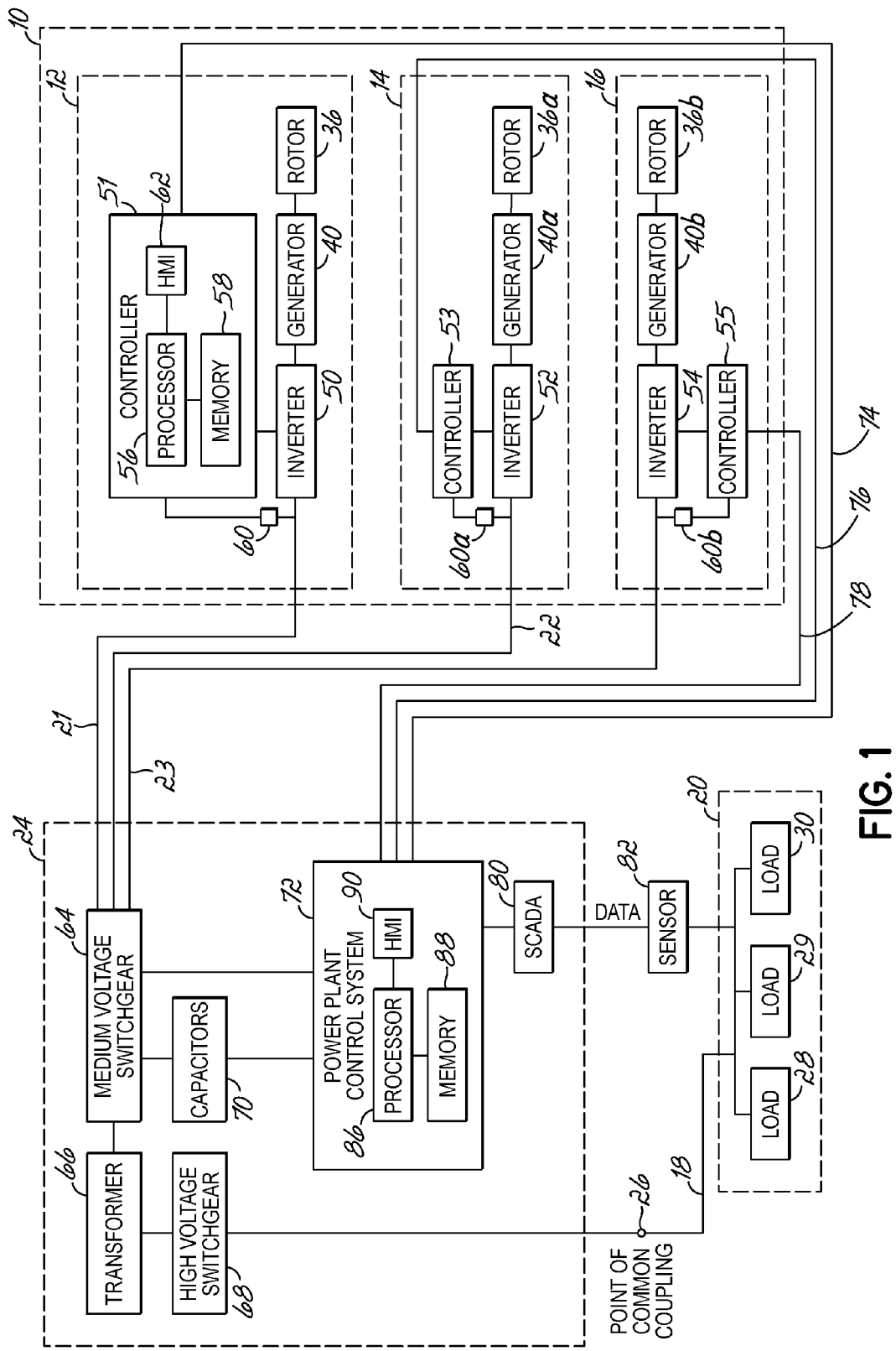
FIG. 1 is a diagrammatic view of a wind park configured to be operated in accordance with the embodiments of the invention.

With reference to FIG. 1 and in accordance with an embodiment of the invention, a wind farm or wind park 10 includes a plurality of wind turbines, such as the representative wind turbines 12, 14, 16, that collectively act as a generating plant ultimately interconnected by transmission lines 18 with a power grid 20, which may be a three-phase power grid. The wind park 10 gangs the multiple wind turbines 12, 14, 16 together at a common location in order to take advantage of the economies of scale that decrease per unit cost with increasing output. It is understood by a person having ordinary skill in the art that the wind park 10 may include an arbitrary number of wind turbines of given capacity in accordance with a targeted power output.

The power grid 20 generally consists of a network of power stations, transmission circuits, and substations coupled by a network of transmission lines. The power stations generate electrical power by nuclear, hydroelectric, natural gas, or coal fired means, or with another type of renewable energy like solar and geothermal. Additional wind parks analogous to wind park 10 may also be coupled with the power grid 20. Electric power is transmitted as three-phase alternating current (AC) over medium voltage cables 21, 22, 23 from the wind park 10 to a substation 24. As appreciated by a person having ordinary skill in the art, electrical power is transmitted at high voltages to diminish energy loss. The electric power is then distributed by the substation 24, which is connected to the power grid at a point of common coupling (PCC) 26, over the transmission lines 18 to end users and other customers constituting loads 28, 29, 30.

Figure 2:
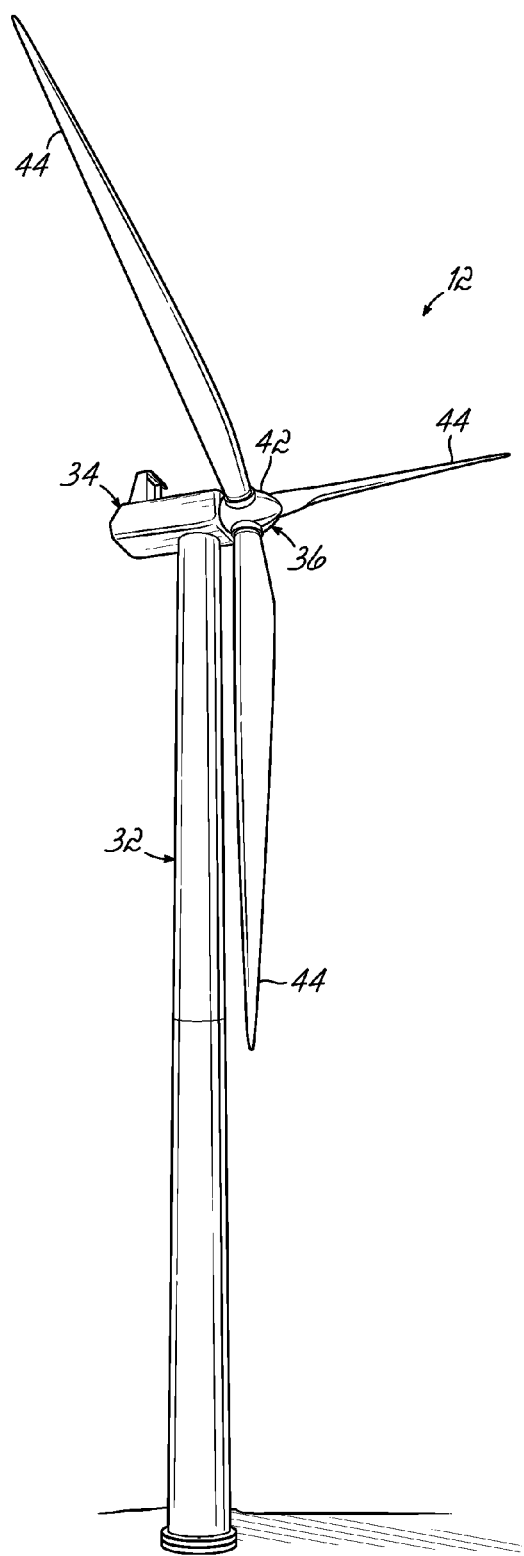
FIG. 2 is a perspective view of one of the wind turbines in the wind park of FIG. 1.
Figure 3:
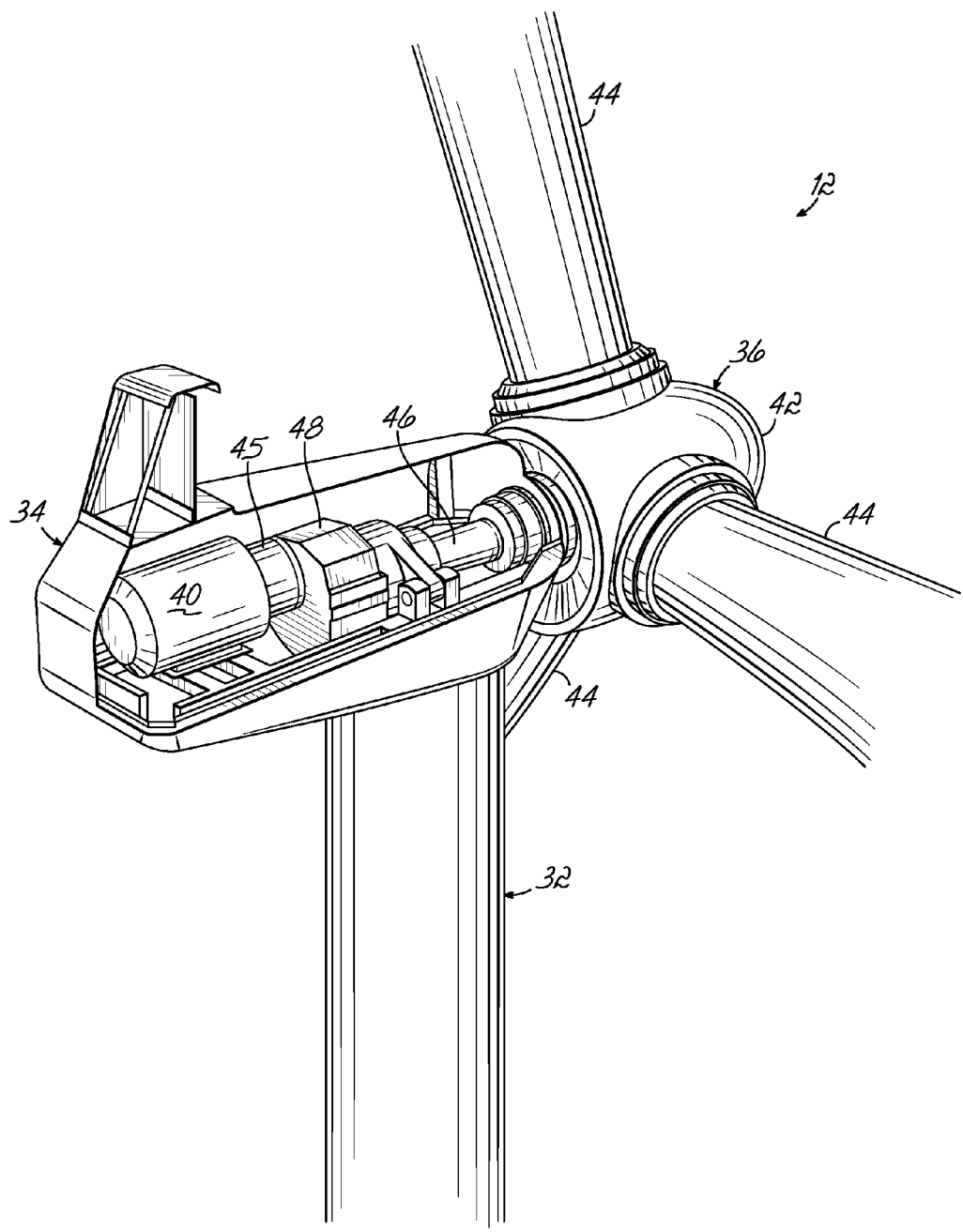
FIG. 3 is a perspective view of a portion of the wind turbine of FIG. 2 in which the nacelle is partially broken away to expose structures housed inside the nacelle.

With reference to FIGS. 2 and 3, the following description of wind turbine 12 applies equally to wind turbines 14, 16. Wind turbine 12 includes a tower 32, a nacelle 34 disposed at the apex of the tower 32, and a rotor 36 operatively coupled to a generator 40 housed inside the nacelle 34. In addition to the generator 40, nacelle 34 houses various components needed to convert the wind energy into electrical energy and also various components needed to operate and optimize the performance of the wind turbine 12. The tower 32 supports the load presented by the nacelle 34, rotor 36, and other wind turbine components housed inside the nacelle 34. The tower 32 of the wind turbine 10 operates to elevate the nacelle 34 and rotor 36 to a height above ground level or sea level, as may be the case, at which air currents of lower turbulence and higher wind speed are typically found.

The rotor 36 includes a central hub 42 and a plurality of blades 44 attached to the central hub 42 at locations distributed about the circumference of the central hub 42. In the representative embodiment, the rotor 36 includes three blades 44. The blades 44, which project radially outward from the central hub 42, are configured to interact with the passing air currents to produce lift that causes the central hub 42 to spin about its longitudinal axis. The design, construction, and operation of the blades 44 are familiar to a person having ordinary skill in the art. For example, pitch angle control of the blades 44 is implemented by a pitch control mechanism (not shown).

A rotor assembly of the generator 40 is coupled by a drive shaft 46 and a gearbox 48 with the rotor assembly of the generator 40. The gearbox 48 relies on gear ratios in a drive train to provide speed and torque conversions from the rotation of the rotor 36 to the rotor assembly of the generator 40. Alternatively, the drive shaft 46 may directly connect the central hub 42 of the rotor 36 with the rotor assembly of the generator 40 so that rotation of the central hub 42 directly drives the rotor assembly to spin relative to a stator assembly of the generator 40. A mechanical coupling 45 provides an elastic connection between the drive shaft 46 and the gear box 48.

The wind turbine 12, which is depicted as a horizontal-axis wind turbine, has the ability to convert the kinetic energy of the wind into electrical power. Specifically, the motion of the rotor assembly of generator 40 relative to the stator assembly of generator 40 functionally converts the mechanical energy supplied from the rotor 36 into electrical power so that the kinetic energy of the wind is harnessed by the wind turbine 12 for power generation. Wind exceeding a minimum level will activate the rotor 36 and cause the rotor 36 to rotate in a substantially perpendicular direction to the wind. Under normal circumstances, the electrical power is supplied to the power grid 20 as known to a person having ordinary skill in the art.

Wind turbine 14 includes a generator 40a similar or identical to generator 40 and a rotor 36a similar or identical to rotor 36. Wind turbine 36 includes a generator 40b similar or identical to generator 40 and a rotor 36b similar or identical to rotor 36.

An inverter 50 is electrically connected to the output of the generator 40 of wind turbine 12. Similarly, inverters 52, 54 are electrically connected to the respective outputs from the generators 40, 40a, 40b of wind turbines 14, 16. The inverters 50, 52, 54 condition the output from the respective generators 40, 40a, 40b to provide an output voltage and current at a frequency and phase appropriate for transmission to the power grid 20. The inverters 50, 52, 54 include active switches, such as power semiconductor devices, in a configuration suitable to condition the generator output to match the requirements of the power grid 20.

Turbine controllers 51, 53, 55 at the wind turbines 12, 14, 16 respectively communicate with the circuitry of the inverters 50, 52, 54 and are operative to dynamically adjust the output voltage, output current, frequency and phase of the electrical power supplied from the inverters 51, 53, 55 through the substation 24 to the power grid 20.

Turbine controller 51, which is representative of turbine controllers 51, 53, 55, can be implemented using one or more processors 56 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 58. Memory 58 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/ or any other device capable of storing digital information.

Processor 56 operates under the control of an operating system, and executes or otherwise relies upon computer program code embodied in various computer software applications, components, programs, objects, modules, data structures, etc. to control the inverter 50, whether implemented as part of the operating system or as a specific application. The control over inverter 50 may be implemented with feedback from a sensor 60 that measures a property of the electrical power output from the inverter 50. The computer program code typically comprises one or more instructions that are resident at various times in memory 58, and that, when read and executed by processor 56, causes the turbine controller 51 to perform the steps necessary to execute steps or elements embodying the various aspects of the invention. In particular, the resident computer program code executing on turbine controller 51 includes a control algorithm operative to dynamically adjust the output voltage, output current, frequency and phase of the electrical power supplied from the inverter 51 through the substation 24 to the power grid 20. The control algorithm selectively actuates and controls the active switches in the inverter 51 to provide the dynamic adjustments.

A human machine interface (HMI) 62 is operatively connected to the processor 56 of the turbine controller 51 in a known manner The HMI 62 may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor 56.

The controllers 53, 55 each have a construction similar or identical to controller 51 and receive measurement feedback from respective sensors 60a, 60b each similar or identical to sensor 60.

The output from each of the inverters 50, 52, 54 is fed over the medium voltage cables 21, 22, 23, respectively, to medium voltage switchgear 64 in the substation 24. The turbine controllers 51, 53, 55 independently control the output voltage, output current, frequency and phase of the electrical power supplied from the respective inverters 51, 53, 55 to the medium voltage switchgear 64. The output from the medium voltage switchgear 64 is connected to a low voltage side of a power transformer 66 in the substation 24. A high voltage side of the transformer 66 is connected to high voltage switchgear 68 in the substation 24. The power transformer 66 matches the output of the wind turbine generators 40, 40a, 40b to the portion of the power grid 20 local to the PCC 26.

Electrical power is routed from the output of the high voltage switchgear 68 to the PCC 26. The medium voltage switchgear 64 and high voltage switchgear 68 each include electrical disconnects, fuses and/or circuit breakers that can be switched on or off under no load, load, or fault conditions to protect electrical equipment, such as the respective generators 40, 40a, 40b of the wind turbines 12, 14, 16. The high voltage switchgear 68 is typically exposed to the elements at the substation 24 and the medium voltage switchgear 64 is usually enclosed within a structure at the substation 24. A set of capacitors 70 can be switched to elevate the output voltage from the substation 24 as needed.

A power plant control (PPC) system 72 at the substation 24 is used to control the operation of the turbine controllers 51, 53, 55 and to coordinate the wind turbines 12, 14, 16 to collectively operate as wind park 10. In particular, the PPC system 72 is configured to cause the turbine controllers 51, 53, 55 to individually control the output from the inverters 50, 52, 54 and may be electrically coupled with the turbine controllers 51, 53, 55 for the inverters 50, 52, 54 over distinct communication pathways 74, 76, 78. The PPC system 72 is also used to control other equipment at the substation 24 including, but not limited to, the operation of the medium voltage switchgear 64 and the charging and discharge of capacitors 70.

A supervisory control and data acquisition (SCADA) control system 80 is configured to monitor and provide supervisory level control over the PPC system 72. The control actions at the SCADA control system 80 may be performed automatically by a remote terminal unit or by a programmable logic controller. The SCADA control system 80 is configured to receive data from a sensor 82 that is connected with the power grid 20. In one embodiment, the sensor 82 tapped into the power grid 20 is a frequency and phase sensor. In an alternative embodiment, the sensor readings from sensor 82 may be supplied directly to the PPC system 72 instead of being forwarded to the PPC system 72 by the SCADA control system 80.

The PPC system 72 outputs current command signals to the turbine controllers 51, 53, 55 enabling the inverters 50, 52, 54 to output a current waveform, which is nominally of the same phase and frequency as detected by the sensor 82 and communicated from the SCADA control system 80 to the PPC system 72. The PPC system 72 synthesizes current waveform templates for all three phases based on a sensed voltage on one phase and transmits currents to all three phases of the power grid 20 based on the synthesized current waveforms. Under nominally normal operating conditions, the current waveform templates of PPC system 72 cause the current, frequency and phase of the electrical power from the inverters 50, 52, 54 to match the current, frequency, and phase of the power grid 20 and thereby provide steady-state operation.

The PPC system 72 can be implemented using one or more processors 86 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 88. Memory 88 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information.

Processor 86 operates under the control of an operating system, and executes or otherwise relies upon computer program code embodied in various computer software applications, components, programs, objects, modules, data structures, etc. to match the current, frequency and phase of the electrical power from the inverters 50, 52, 54 with the current, frequency, and phase of the power grid 20. The computer program code also relies on a small-signal stability control algorithm to resolve a characteristic, such as the fundamental frequency components, of the electrical power on the power grid 20, and to generate the control signals communicated to the turbine controllers 51, 53, 55 for individually controlling the output from the inverters 50, 52, 54. The computer program code typically comprises one or more instructions that are resident at various times in memory 88, and that, when read and executed by processor 86, causes the PPC system 72 to perform the steps necessary to execute steps or elements embodying the various aspects of the invention.

In one embodiment, the small-signal stability control algorithm may be any Fast Fourier transform (FFT) control algorithm having the ability to compute and to decompose each sensor measurement of frequency into its different constituent components. The FFT control algorithm determines the harmonic magnitude and phase of an input signal as a function of time. The FFT control algorithm may rely on phase compensation in the frequency domain and the supplemental control signals are introduced as a lead-lag compensator of the wind turbine output from inverters 50, 52, 54. In a specific embodiment, the FFT control algorithm may be a Cooley-Tukey FFT control algorithm that uses a recursive approach to resolve the discrete Fourier transform (DFT) into multiple smaller DFTs and, via additional numerical manipulation, is used to calculate eigenvalues.

A human machine interface (HMI) 90 is operatively connected to the processor 86 in a conventional manner. The HMI 90 may include output devices, such as alphanumeric displays, a touch screen, and other visual indicators, and input devices and controls, such as an alphanumeric keyboard, a pointing device, keypads, pushbuttons, control knobs, etc., capable of accepting commands or input from the operator and transmitting the entered input to the processor 86.

The PPC system 72 is configured to response to small signal stability concerns that represent transient deviations in the current, frequency, and phase of the power grid 20 from steady-state operating conditions. In particular, the PPC system 72 is capable of generating supplemental control signals using the small-signal stability control algorithm and communicating these supplemental control signals to the turbine controllers 51, 53, 55 to cause deviation-responsive modulations in the characteristics of the electrical power output from the inverters 50, 52, 54. The PPC system 72 can provide supplemental control signals with different modulation instructions to turbine controllers 51, 53, 55 to provide independent power modulation by each of the wind turbines 12, 14, 16. Typically, the supplemental controls signals are used to dampen low frequency oscillations in the range of 0.1 Hertz (Hz) to 3 Hz.

To provide the independent control, the PPC system 72 screens at least one characteristic, such as one or more of the fundamental frequency components, of the electrical power on the power grid 20 for perturbations or deviations. To that end, the PPC system 72 analyzes the readings from sensor 82 using the small-signal stability control algorithm. Deviations in the measured characteristic, such as any of the fundamental frequency components resolved from frequency readings, that meet or exceed one or more pre-set criteria are flagged as a small signal stability concern. For example, a reference value and deviation threshold may be set for each frequency component to screen for lower frequency oscillations of an amplitude significant enough to prompt the generation of a supplemental control signal. The PPC system 72 responds to each small signal stability concern by generating and transmitting one or more supplemental control signals from the PPC system 72 to the turbine controllers 51, 53, 55 at the individual turbines 12, 14, 16. The turbine controllers 51, 53, 55 will in turn control the respective inverters 50, 52, 54 to respond with an appropriate voltage or power oscillation to damp the low frequency oscillations associated with each small signal stability concern within the power grid 20.

In one embodiment, the modulation of the output of voltage and current at one or more of the wind turbines 12, 14, 16 supplied by the supplemental control signals may be executed in real time and almost instantaneously. In the specific embodiment of a Cooley-Tukey FFT control algorithm, each eigenvalue represents an oscillation mode of the electrical power on the power grid 20. The PPC system 72 can calculate and evaluate the eigenvalues in real time, which results in the ability to supply supplemental control signals to modulate the output of voltage and current at one or more of the wind turbines 12, 14, 16 at the wind park 10 in real time.

The supplemental control signals are selected to cause the inverters 50, 52, 54 to output electrical power in a manner that superimposes with each oscillation mode of the electrical power on the power grid 20 and thereby cancel the low frequency oscillations causing the small signal stability concerns. The cancellation process utilizes a feedback loop based on the low frequency oscillations of the power grid 20 that are measured by the sensor 82 and assessed by the small-signal stability control algorithm. The supplemental control signals persist but decrease in amplitude until the transient low frequency oscillations characteristic of each small signal stability concern are dampened and corrective action at the wind turbine level is no longer needed based upon the pre-set criteria.

Because the wind park 10 consists of multiple wind turbines, including the representative wind turbines 12, 14, 16, each capable of independently outputting electrical power to the power grid 20, multiple supplemental control signals can be sent from the PPC system 72 to damp multiple small signal stability concerns. Consequently, both transient local and regional oscillations of the electrical power on the power system represented by the power grid 20 can be concurrently dampened using the wind park 10. Under the master control of the PPC system 72 and the slave control of controllers 51, 53, 55, the wind turbines 12, 14, 16 may be used to counteract and dampen multiple oscillation modes at different low frequencies. For example, a first number of wind turbines at the wind park 10, including wind turbines 12, 14, can be instructed to operate to dampen oscillations at one frequency and a second number of wind turbines at the wind park 10, including wind turbine 16, can be instructed to operate to dampen oscillations at a different frequency. As a numerical example, one of the dampened low frequency oscillation modes may have a frequency of 1.5 Hz and be dampened in conjunction with supplemental control signals communicated to six (6) wind turbines at the wind park 10, and another of the dampened low frequency oscillation modes may have a frequency in a range of 0.1 Hz to 0.7 Hz and may be dampened in conjunction with supplemental control signals communicated to three (3) wind turbines at the wind park 10.

As will be appreciated by one skilled in the art, the embodiments of the invention may also be embodied in a computer program product embodied in at least one computer readable storage medium having computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage medium include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code for carrying out operations for the embodiments of the present invention may be written in one or more object oriented and procedural programming languages.

The methods described herein can be implemented by computer program instructions supplied to the processor of any type of computer to produce a machine with a processor that executes the instructions to implement the functions/acts specified herein. These computer program instructions may also be stored in a computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In use, sensor 82 communicates data, such as the frequency and phase of the electrical power on the power grid 20, to the SCADA control system 80. The SCADA control system 80 relays the readings to the PPC system 72, which uses the small-signal stability control algorithm to assess the readings for the presence of small signal stability concerns. The PPC system 72 communicates control signals to the turbine controllers 51, 53, 55 to cause the inverters 50, 52, 54 to modulate the output from the generators 40 of the wind turbines 12, 14, 16. The control signals are selected to cause the inverters 50, 52, 54 to output electrical power in a manner that superimposes with the low frequency oscillations on the power grid 20 to cancel the small signal stability concerns. In particular, the wind turbines 12, 14, 16 are used to counteract and dampen multiple oscillation modes characteristic of small signal stability concerns. For example, different subsets of the wind turbines at the wind park 10 can be instructed to operate to dampen low frequency oscillations characteristic of one mode and a second number of wind turbines at the wind park 10 can be instructed to operate to dampen low frequency oscillations characteristic of a different mode.

The response of the PPC system 72 is similar to the response generated by conventional Power System Stabilizers (PSS) widely used to mitigate low-frequency oscillations of an interconnected power grid. The reliance of the PPC system 72 upon the inverters 50, 52, 54 at the wind turbine level to modulate voltage and power output enhances the dynamics of the power grid and is capable of dampening multiple oscillation modes using the multiple wind turbines in operation at the wind park 10. The enhancement to the capabilities of the wind park 10 per the embodiments of the invention permits the modulation to be adjusted by the number of wind turbines 12, 14, 16 on line adding an additional variability mode to match system needs.

While described in terms of dampening oscillations relating to small signal stability concerns, the embodiments of the invention may be used to dampen oscillations of other origins. However, the preferred application for the embodiments of the invention relates to dampening oscillations relating to small signal stability concerns.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A system for dampening first oscillations of a first frequency in electrical power on a power grid and second oscillations of a second frequency different than the first frequency in the electrical power on the power grid, the system comprising:
   a wind park including a first wind turbine and a second wind turbine, each of the first and second wind turbines including a rotor, a generator operatively coupled with the rotor for generating electrical power, and an inverter coupling the generator with the power grid to output the electrical power to the power grid;
   a sensor configured to provide oscillation data associated with the power grid; and
   a controller coupled with the inverter of the first wind turbine and with the inverter of the second wind turbine, the controller configured to generate first and second control signals based on a small-signal stability control algorithm, the algorithm being capable of resolving, from the oscillation data, a first frequency component of the electrical power on the power grid that is used to generate the first control signal and a second frequency component of the electrical power on the power grid that is used to generate the second control signal, the controller configured to provide the first control signal to the inverter of the first wind turbine so that the inverter of the first wind turbine is operated to modulate the electrical power output by the first wind turbine to dampen the first oscillations, and the controller configured to provide the second control signal to the inverter of the second wind turbine so that the inverter of the second wind turbine is operated to modulate the electrical power output by the second wind turbine to dampen the second oscillations during a time period that at least partially overlaps with a time period during which the first wind turbine dampens the first oscillations.

2. The system of claim 1 wherein the small-signal stability control algorithm is a Fast Fourier transform (FFT) control algorithm.

3. The system of claim 1 wherein the first wind turbine includes a turbine controller coupled in communication with the controller, the turbine controller of the first wind turbine configured to operate the inverter of the first wind turbine based upon the first control signal.

4. The system of claim 3 wherein the second wind turbine includes a turbine controller coupled in communication with the controller, the turbine controller of the second wind turbine configured to operate the inverter of the second wind turbine based upon the second control signal.

5. The system of claim 1 wherein the controller is included in a power plant control (PPC) system located at a substation.

6. A method for dampening first oscillations of a first frequency in electrical power on a power grid and second oscillations of a second frequency different from the first frequency in electrical power on the power grid, the method comprising:
   receiving, from a sensor, oscillation data associated with the power grid;
   operating an inverter of a first wind turbine by generating a first control signal based on the received oscillation data, the first control signal causing the inverter to modulate electrical power output from a generator of the first wind turbine for dampening the first oscillations; and
   operating an inverter of a second wind turbine by generating a second control signal based on the received oscillation data, the second control signal causing the inverter to modulate electrical power output from a generator of the second wind turbine for dampening the second oscillations during a time period that at least partially overlaps with a time period during which the first wind turbine dampens the first oscillations.

7. The method of claim 6 wherein the first wind turbine includes a turbine controller that is coupled with the inverter of the first wind turbine, and further comprising:
   communicating the first control signal to the turbine controller of the first wind turbine; and
   causing the turbine controller of the first wind turbine to operate the inverter of the first wind turbine.

8. The method of claim 6 further comprising:
using a small-signal stability control algorithm executing on a processor to resolve a first frequency component from the received oscillation data and to operate the inverter of the first wind turbine based upon the first frequency component; and
using the small-signal stability control algorithm executing on the processor to resolve a second frequency component from the received oscillation data and to operate the inverter of the second wind turbine based upon the second frequency component.

9. The method of claim 6 further comprising:
using a Fast Fourier transform (FFT) control algorithm executing on a processor to resolve a first frequency component from the received oscillation data and to operate the inverter of the first wind turbine based upon the first frequency component; and
using the Fast Fourier transform (FFT) control algorithm executing on the processor to resolve a second frequency component from the received oscillation data and to operate the inverter of the second wind turbine based upon the second frequency component.

10. The method of claim 6 further comprising:
using a Cooley-Tukey Fast Fourier transform (FFT) control algorithm executing on a processor to resolve a first frequency component from the received oscillation data and to operate the inverter of the first wind turbine based upon the first frequency component; and
using the Cooley-Tukey Fast Fourier transform (FFT) control algorithm executing on the processor to resolve a second frequency from the received oscillation data and to operate the inverter of the second wind turbine based upon the second frequency component.

11. A non-transitory computer program product comprising:
a computer readable storage medium;
first program instructions for operating an inverter of a first wind turbine in a wind park, the first program instructions generating a first control signal based on oscillation data received from a sensor associated with a power grid, the first control signal causing the inverter of the first wind turbine to modulate electrical power output from a generator of the first wind turbine for dampening oscillations of a first frequency in electrical power on the power grid; and
second program instructions for operating an inverter of a second wind turbine in the wind park, the second program instructions generating a second control signal based on the oscillation data received from the sensor, the first control signal causing the inverter of the second wind turbine to modulate electrical power output from a generator of the second wind turbine for dampening oscillations of a second frequency in the electrical power on the power grid during a time period that at least partially overlaps with a time period during which the first wind turbine dampens the first oscillations, the second frequency being different than the first frequency,
wherein the first and second program instructions are stored on the computer readable storage medium.

12. The computer program product of claim 11 further comprising:
third program instructions for using a small-signal stability control algorithm executing on a processor to resolve a first frequency component from the received oscillation data and to generate the first control signal based upon the first frequency component; and
fourth program instructions for using the small-signal stability control algorithm executing on the processor to resolve a second frequency component from the received oscillation data and to generate the second control signal based upon the second frequency component,
wherein the third and fourth program instructions are stored on the computer readable storage medium.

13. The computer program product of claim 11 further comprising:
third program instructions for using a Fast Fourier transform (FFT) control algorithm executing on a processor to resolve a first frequency component of the electrical power on the power grid and to generate the first control signal based upon the first frequency component; and
fourth program instructions for using the Fast Fourier transform (FFT) control algorithm executing on the processor to resolve a second frequency component from the received oscillation data and to generate the second control signal based upon the second frequency component,
wherein the third and fourth program instructions are stored on the computer readable storage medium.

14. The computer program product of claim 11 further comprising:
third program instructions for using a Cooley-Tukey Fast Fourier transform (FFT) control algorithm executing on a processor to resolve a first frequency from the received oscillation data and to generate the first control signal based upon the first frequency component; and
fourth program instructions for using the Cooley-Tukey small-signal stability control algorithm executing on the processor to resolve a second frequency component from the received oscillation data and to generate the second control signal based upon the second frequency component,
wherein the third and fourth program instructions are stored on the computer readable storage medium.

15. The computer program product of claim 11 further comprising:
third program instructions for communicating the first control signal to a turbine controller of the first wind turbine; and
fourth program instructions for causing the turbine controller of the first wind turbine to operate the inverter of the first wind turbine,
wherein the third and fourth program instructions are stored on the computer readable storage medium.

16. The computer program product of claim 11 further comprising:
third program instructions for using a small-signal stability control algorithm executing on a processor to resolve a first frequency component from the received oscillation data and to operate the inverter of the first wind turbine based upon the first frequency component; and
fourth program instructions for using the small-signal stability control algorithm executing on the processor to resolve a second frequency component from the received oscillation data and to operate the inverter of the second wind turbine based upon the second frequency component,
wherein the third and fourth program instructions are stored on the computer readable storage medium.

17. The computer program product of claim 11 further comprising:
third program instructions for using a Fast Fourier transform (FFT) control algorithm executing on a processor to resolve a first frequency component from the received oscillation data and to operate the inverter of the first wind turbine based upon the first frequency component; and fourth program instructions for using the Fast Fourier transform (FFT) control algorithm executing on the processor to resolve a second frequency component from the received oscillation data and to operate the inverter of the second wind turbine based upon the second frequency component, wherein the third and fourth program instructions are stored on the computer readable storage medium.

* * * * *